(12) United States Patent
Chien

(10) Patent No.: US 9,843,712 B2
(45) Date of Patent: Dec. 12, 2017

(54) IMAGE FOCUSING METHOD UTILIZING PLURAL PHASE DIFFERENCES AND IMAGE PICKUP DEVICE USING THE SAME

(71) Applicant: Primax Electronics Ltd., Neihu, Taipei (TW)

(72) Inventor: Jui-Ting Chien, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 36 days.

(21) Appl. No.: 15/047,420

(22) Filed: Feb. 18, 2016

(65) Prior Publication Data
US 2017/0155819 A1 Jun. 1, 2017

(30) Foreign Application Priority Data
Nov. 27, 2005 (TW) ................. 104139733

(51) Int. Cl.
*H04N 5/232* (2006.01)
*G02B 7/36* (2006.01)
*G03B 13/36* (2006.01)

(52) U.S. Cl.
CPC .......... *H04N 5/23212* (2013.01); *G02B 7/36* (2013.01); *G03B 13/36* (2013.01)

(58) Field of Classification Search
CPC .................................................. H04N 5/23212
See application file for complete search history.

*Primary Examiner* — Gary C Vieaux
(74) *Attorney, Agent, or Firm* — Evan R. Witt; Kirton McConkie

(57) ABSTRACT

An image focusing method and an image pickup device using the image focusing method are provided. The image focusing method includes following steps. Firstly, an image is captured. Then, the plural first incident light pixels of the image are collected as a first pattern, and plural second incident light pixels of the image as a second pattern. The first pattern has a first block corresponding to a focusing area of the image. The second pattern has a second block corresponding to the focusing area of the image. Then, a phase difference between the first block and the second block and phase differences between the first block and plural test block are obtained. The test blocks are partially overlapped with the second block or located near the second block. Afterwards, a lens module is moved according to the lowest phase difference.

8 Claims, 5 Drawing Sheets

4

| Motor movement steps | Peak signal-to-noise ratio |
|---|---|
| a1 | b1 |
| a2 | b2 |
| ⋮ | ⋮ |
| az | bz |

IMAGE FOCUSING METHOD UTILIZING PLURAL PHASE DIFFERENCES AND IMAGE PICKUP DEVICE USING THE SAME

FIELD OF THE INVENTION

The present invention relates to an optical imaging field, and more particularly to an image focusing method and an image pickup device using the image focusing method.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various image pickup devices are widely used in many kinds of fields such as smart phones, wearable electronic devices, aerial imaging devices or any other appropriate electronic devices. Since the image pickup devices are small and portable, the users can take the image pickup devices to capture images and store the images according to the users' requirements at any time. Moreover, the images can be uploaded to the internet through mobile networks. In other words, these electronic devices not only have important commercial values but also provide more colorful lives to people.

Conventionally, the image pickup device is equipped with an auto focus (AF) system. The auto focus system has an important influence on the imaging quality. Generally, an automatic focusing technology is used for moving a lens module to adjust the distance between the lens module and the object and calculating a focusing evaluation value (e.g., a contrast value) of the image of the object until the maximum focusing evaluation value is searched. In particular, the position of the lens module corresponding to the maximum focusing evaluation value is the position for acquiring the sharpest image. In accordance with a hill-climbing method or a regression method of the conventional automatic focusing technology, one focusing operation needs to continuously move the lens module and search the maximum focusing evaluation value. That is, the implementation of the conventional automatic focusing technology is time-consuming. Moreover, during the process of positioning the lens module, the lens module is possibly shifted to a large extent. Since it is necessary to move the lens module back and forth, the periphery part of the image may be intermittently beyond the sensing region. Under this circumstance, a so-called respiratory motion possibly occurs. The respiratory motion adversely affects the stability of the image focusing process.

From the above discussions, the conventional image pickup device and the conventional image focusing method need to be further improved.

SUMMARY OF THE INVENTION

An object of the present invention provides an image focusing method. During the image focusing process, only one image is acquired and the distance of moving the lens module to complete the focusing operation is realized according to the phase differences. Consequently, the image focusing speed is largely reduced, and the stability of the image focusing process is enhanced.

Another object of the present invention provides relates to an image pickup device, and more particularly to an image pickup device using the image focusing method of the present invention.

In accordance with an aspect of the present invention, there is provided an image focusing method. The image focusing method includes the following steps. Firstly, an image is captured. The image contains plural phase detection pixel groups. The plural phase detection pixel groups include plural first incident light pixels and plural second incident light pixels, respectively. Then, the plural first incident light pixels are collected as a first pattern, and the plural second incident light pixels are collected as a second pattern. The first pattern has a first block corresponding to a focusing area of the image. The second pattern has a second block corresponding to the focusing area of the image. Then, a phase difference between the first block and the second block is acquired, and phase differences between the first block and plural test blocks are acquired. The plural test blocks are partially overlapped with the second block or located near the second block. Then, a lens module is moved according to the lowest phase difference among the plural phase differences, so that a focusing operation is performed.

In accordance with another aspect of the present invention, there is provided an image pickup device. The image pickup device includes a lens module, a sensing unit, an image segmentation unit, a computing unit and a driving unit. After light beams passing through the lens module are projected on the sensing unit, the sensing unit senses the light beams and acquires an image. The sensing unit includes plural phase detection unit groups. The image contains plural phase detection pixel groups corresponding to the plural phase detection unit groups. The plural phase detection pixel groups include plural first incident light pixels and plural second incident light pixels, respectively. The image segmentation unit is connected with the sensing unit. The image segmentation unit collects the plural first incident light pixels as a first pattern and collects the plural second incident light pixels as a second pattern. The first pattern has a first block corresponding to a focusing area of the image. The second pattern has a second block corresponding to the focusing area of the image. The computing unit is connected with the image segmentation unit. The computing unit acquires a phase differences between the first block and the second block and acquires phase differences between the first block and plural test blocks, and the computing unit generates a driving signal according to the lowest phase difference among the plural phase differences. The plural test blocks are partially overlapped with the second block or located near the second block. The driving unit is connected between the computing unit and the lens module. According to the driving signal, the driving unit drives movement of the lens module to perform a focusing operation.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 7 is a lookup table illustrating the relationship between the acquired largest peak signal-to-noise ratio of the computing unit and the movement steps of the step motor to perform the focusing operation.

DETAILED DESCRIPTION OF THE PREFERRED EMBODIMENT

Figure 1:
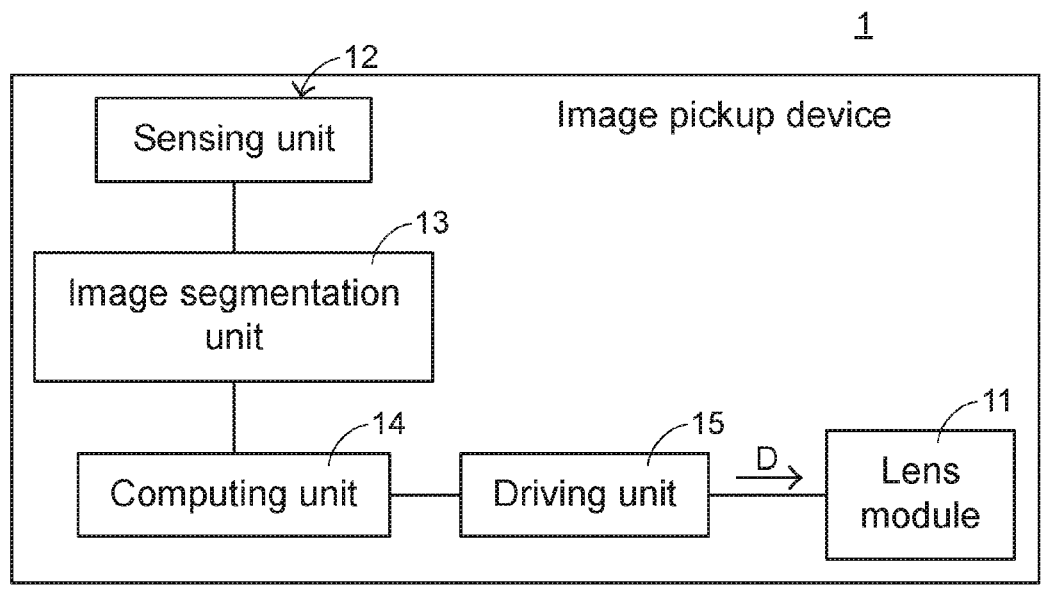
FIG. 1 is a schematic functional block illustrating an image pickup device according to an embodiment of the present invention.
Figure 2:
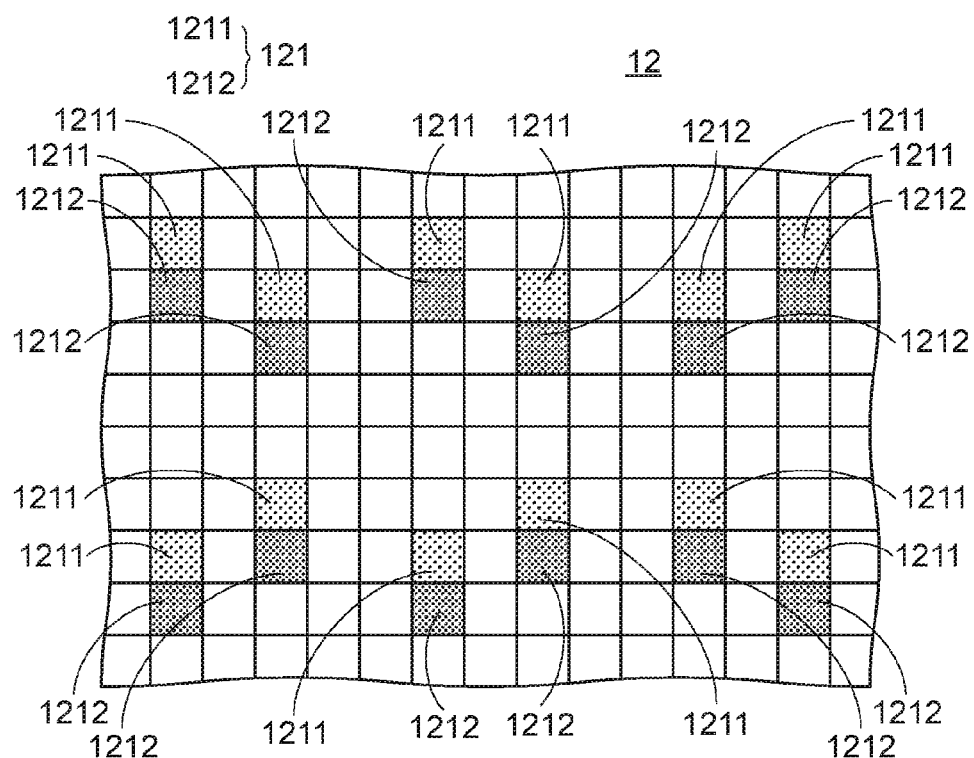
FIG. 2 schematically illustrates a sensing unit of the image pickup device of FIG. 1.

Hereinafter, the components of an image pickup device will be illustrated with reference to FIGS. 1 and 2. FIG. 1 is a schematic functional block illustrating an image pickup device according to an embodiment of the present invention. FIG. 2 schematically illustrates a sensing unit of the image pickup device of FIG. 1. The image pickup device 1 comprises a lens module 11, a sensing unit 12, an image segmentation unit 13, a computing unit 14 and a driving unit 15. The image segmentation unit 13 is connected between the sensing unit 12 and the computing unit 14. The driving unit 15 is connected between the computing unit 14 and the lens module 11. The driving unit 15 is used for driving movement of the lens module 11 in order to perform a focusing operation. After the light beams passing through the lens module 11 are projected on the sensing unit 12, an image is acquired by the sensing unit 12. In this embodiment, the sensing unit 12 comprises plural phase detection unit groups 121. Each phase detection unit group 121 comprises a first incident light phase detection unit 1211 and a second incident light phase detection unit 1212.

Figure 3:
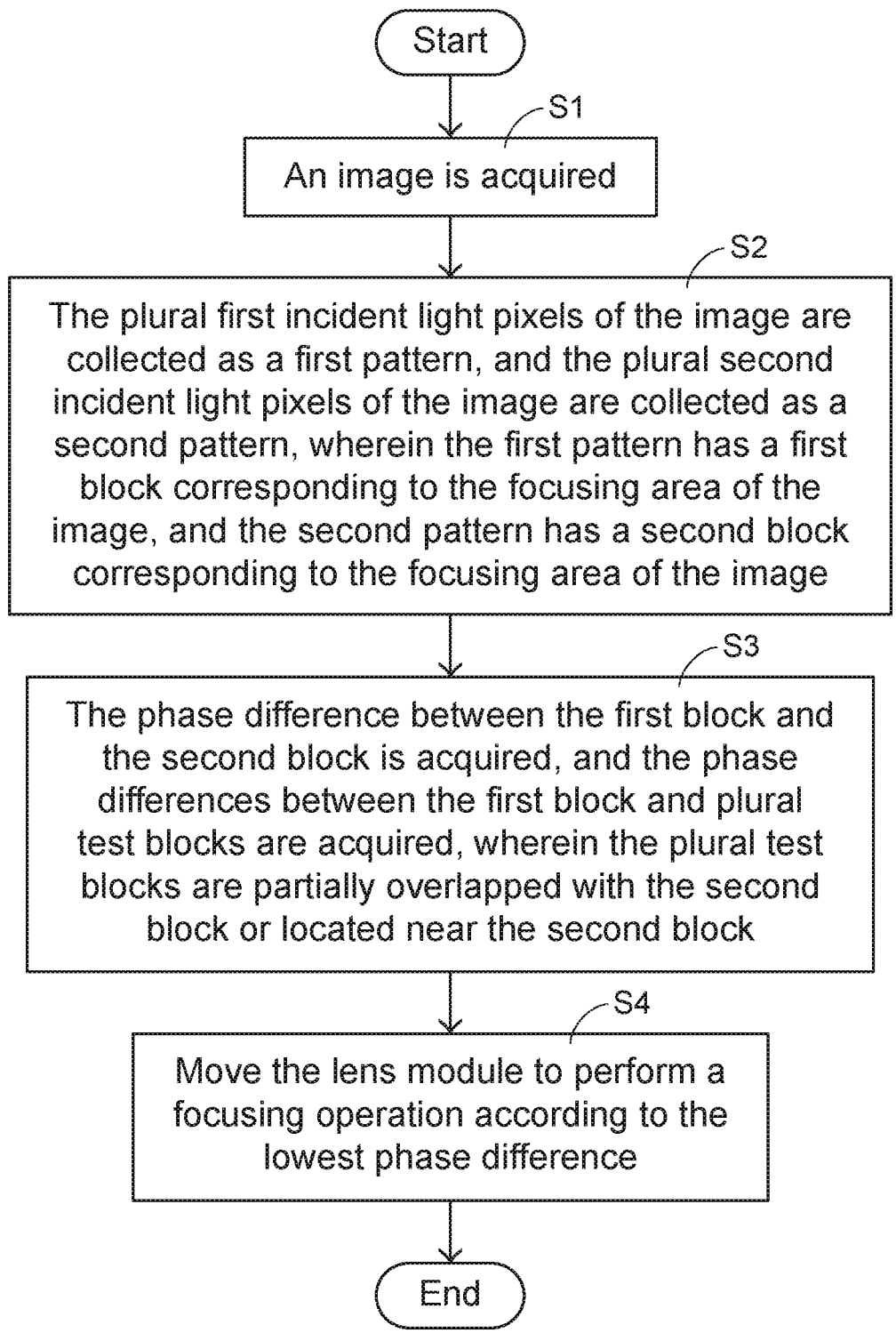
FIG. 3 is a flowchart illustrating an image focusing method according to an embodiment of the present invention.
Figure 4:
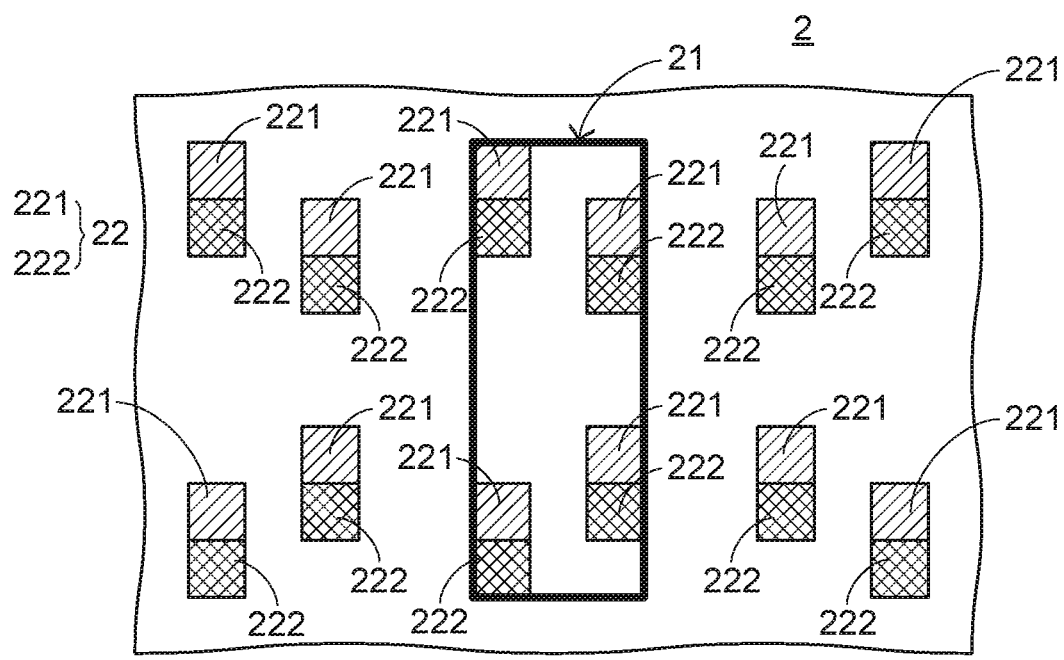
FIG. 4 schematically illustrates an image obtained in the step S1 of the image focusing method of FIG. 3.
Figure 5A:
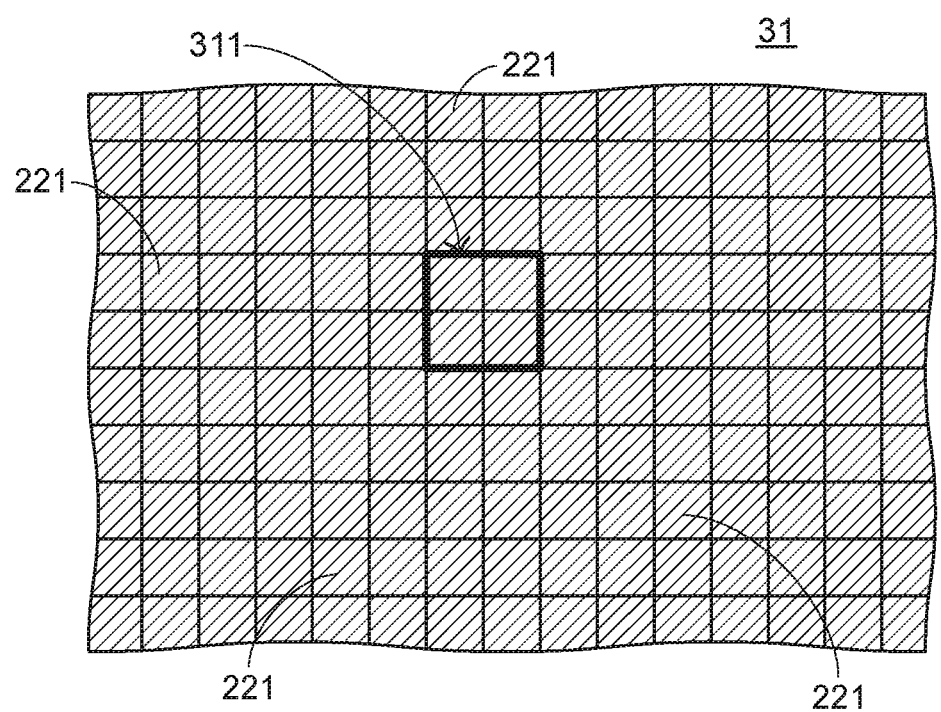
FIG. 5A schematically illustrates a first pattern obtained by the image focusing method of FIG. 3.
Figure 5B:
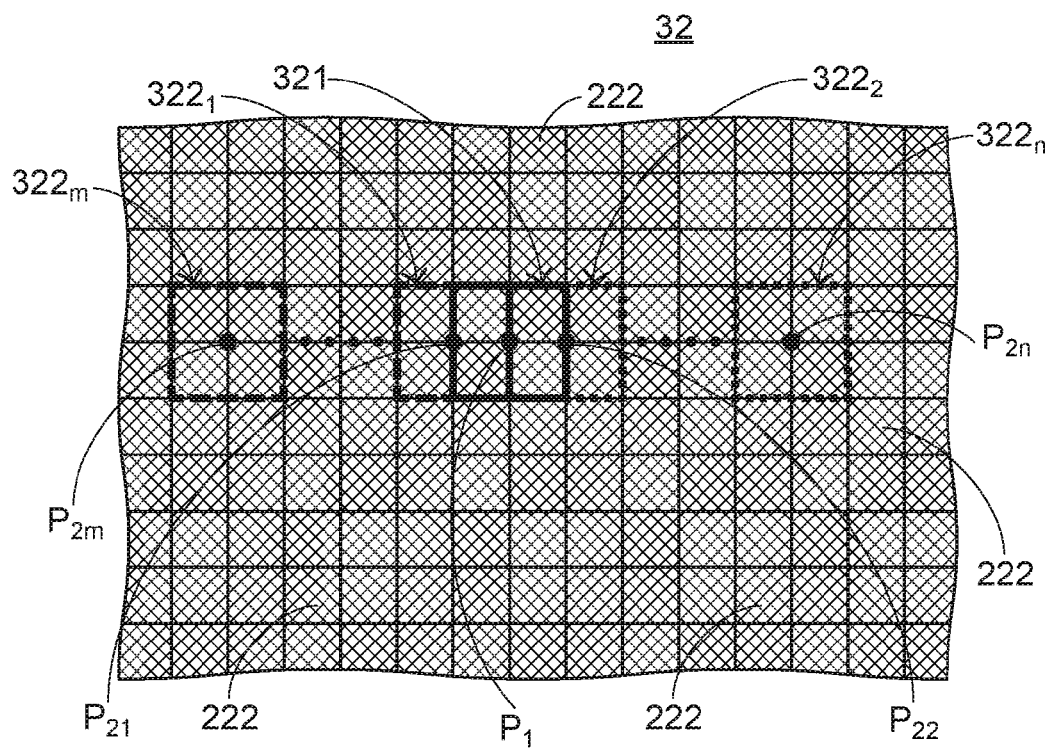
FIG. 5B schematically illustrates a second pattern obtained by the image focusing method of FIG. 3.

Hereinafter, an image focusing method for the image pickup device will be illustrated with reference to FIGS. 3, 4, 5A and 5B. FIG. 3 is a flowchart illustrating an image focusing method according to an embodiment of the present invention. FIG. 4 schematically illustrates an image obtained in the step S1 of the image focusing method of FIG. 3. FIG. 5A schematically illustrates a first pattern obtained by the image focusing method of FIG. 3. FIG. 5B schematically illustrates a second pattern obtained by the image focusing method of FIG. 3. The image focusing method comprises steps S1~S4. The steps S1~S4 will be illustrated in more details as follows.

When the image pickup device 1 is ready to shoot a scene, the step S1 is performed. In the step S1, the sensing unit 12 of the image pickup device 1 captures an image 2. The image 2 has a focusing area 21. The position of the focusing area 21 can be automatically judged by the image pickup device 1, or the position of the focusing area 21 can be determined according to the settings of the user of the image pickup device 1. Since the sensing unit 12 comprises plural phase detection unit groups 121, the acquired image 2 contains plural phase detection pixel groups 22 corresponding to the plural phase detection unit groups 121. As shown in FIG. 4, each phase detection pixel group 22 comprises a first incident light pixel 221 corresponding to the first incident light phase detection unit 1211 and a second incident light pixel 222 corresponding to the second incident light phase detection unit 1212. In this embodiment, the first incident light pixel 221 is a left incident light pixel, and the second incident light pixel 222 is a right incident light pixel. It is noted that the types of the first incident light pixel 221 and the second incident light pixel 222 are not restricted. For example, in another embodiment, the first incident light pixel 221 is a right incident light pixel, and the second incident light pixel 222 is a left incident light pixel.

In the step S2, the image 2 from the sensing unit 12 is received by the image segmentation unit 13. The image segmentation unit 13 collects the plural first incident light pixels 221 of the image 2 as a first pattern 31 and collects the plural second incident light pixels 222 of the image 2 as a second pattern 32. The first pattern 31 and the second pattern 32 are shown in FIGS. 5A and 5B, respectively. Moreover, the first pattern 31 has a first block 311 corresponding to the focusing area 21 of the image 2, and the second pattern 32 has a second block 321 corresponding to the focusing area 21 of the image 2.

In the step S3, the first pattern 31 and the second pattern 32 from the image segmentation unit 13 are received by the computing unit 14. The computing unit 14 acquires the phase difference $E_1$ between the first block 311 and the second block 321, and acquires the phase differences $E_{21}$, $E_{22}$, ..., $E_{2m}$, $E_{2n}$ between the first block 311 and plural test blocks $322_1$, $322_2$, ..., $322_m$, $322_n$. The plural test blocks $322_1$, $322_2$, ..., $322_m$, $322_n$ are partially overlapped with the second block 321 or located near the second block 321.

In this embodiment, some of the plural test blocks $322_1$, $322_2$, ..., $322_m$, $322_n$ are located at the left side of the second block 321, and the others of the plural test blocks $322_1$, $322_2$, ..., $322_m$, $322_n$ are located at the right side of the second block 321. The second block 321 and the plural test blocks $322_1$, $322_2$, ..., $322_m$, $322_n$ have the same size. Moreover, as shown in FIG. 5B, the distance between any two adjacent center positions of the center $P_1$ of the second block 321 and the center positions $P_{21}$, $P_{22}$, ..., $P_{2m}$, $P_{2n}$ of the plural test blocks $322_1$, $322_2$, ..., $322_m$, $322_n$ along the horizontal direction (i.e., the left/right phase difference) is equal to 1 pixel. The selections of the plural test blocks $322_1$, $322_2$, ..., $322_m$, $322_n$ are presented herein for purpose of illustration and description only. It is noted that the selections of the plural test blocks may be varied according to the practical requirements.

In case that the focusing area 21 of the image 2 is in an accurate focusing situation, the phase difference $E_1$ between the first block 311 and the second block 321 is zero or very small. Whereas, in case that the focusing area 21 of the image 2 is not in the accurate focusing situation, the first block 311 and the second block 321 have different phases. Then, among the phase differences between the second blocks 321 and the plural test blocks $322_1$, $322_2$, ..., $322_m$, $322_n$ and the first block 311, the lowest phase difference is selected. Then, a phase-compensating operation is performed according to the lowest phase difference. That is, the lens module 11 is moved to perform the focusing operation. The detailed procedure will be illustrated in the step S4.

In this embodiment, the phase difference $E_1$ between the first block 311 and the second block 321 and the phase differences $E_{21}$, $E_{22}$, ..., $E_{2m}$, $E_{2n}$ between the first block 311 and plural test blocks $322_1$, $322_2$, ..., $322_m$, $322_n$ are obtained by calculating peak signal-to-noise ratios (PSNR). Generally, the peak signal-to-noise ratio is an objective standard of evaluating the similarity of two patterns. A higher peak signal-to-noise ratio indicates a smaller phase difference. The relationship between the peak signal-tonoise ratio and the phase difference is well known to those skilled in the art, and is not redundantly described herein. It is noted that the standard of evaluating the phase difference is not restricted to the peak signal-to-noise ratio. However, the standard of evaluating the phase difference may be varied according to the practical requirements.

In the step S4, the computing unit 14 generates a driving signal D to the driving unit 15 according to the lowest phase difference among the phase differences $E_1$, $E_{21}$, $E_{22}$, ..., $E_{2m}$, $E_{2n}$. As mentioned above, the phase differences are evaluated according to the peak signal-to-noise ratios (PSNR). In other words, the computing unit 14 generates the corresponding driving signal D to the driving unit 15 according to the largest peak signal-to-noise ratio. After the driving signal D from the computing unit 14 is received by the driving unit 15, the driving unit 15 drives movement of the lens module 11 in order to perform the focusing operation. After the focusing operation is completed, the image pickup device 1 shoots the scene.

Figure 6:
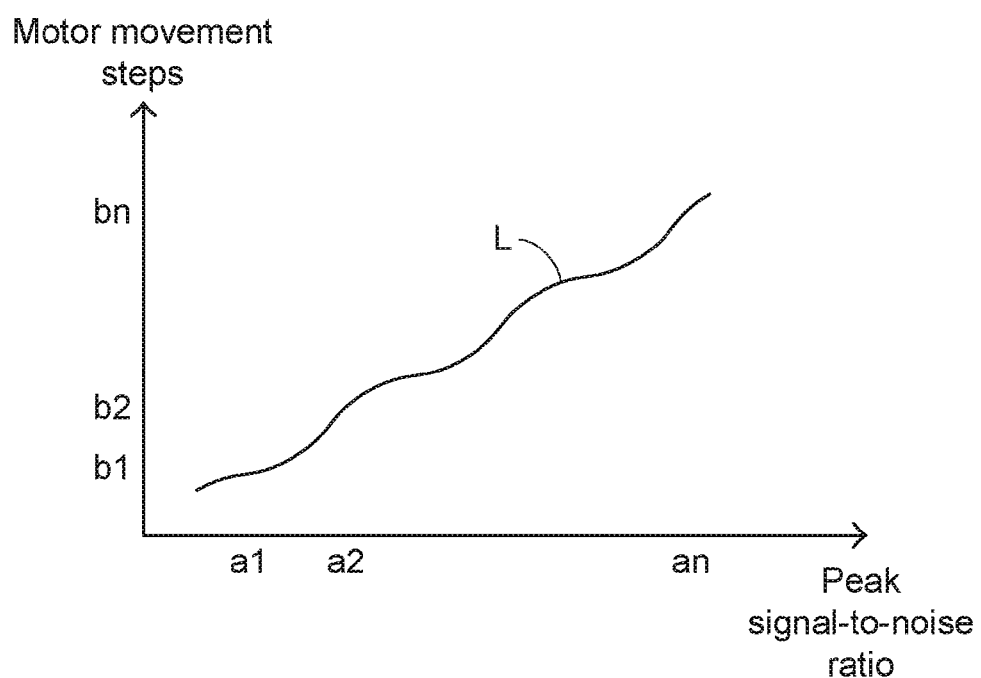
FIG. 6 is a plot illustrating the relationship between the acquired largest peak signal-to-noise ratio of the computing unit and the movement steps of the step motor to perform the focusing operation.

In an embodiment, the driving unit 15 is a step motor, and the driving signal D contains the message about the required movement steps to complete the focusing operation. FIG. 6 is a plot illustrating the relationship between the acquired largest peak signal-to-noise ratio of the computing unit and the movement steps of the step motor to perform the focusing operation. For example, in case that the acquired largest peak signal-to-noise ratio of the computing unit 14 is a1, the driving signal D containing the movement steps b1 of the step motor is outputted from the computing unit 14 to the step motor. Consequently, the lens module 11 is moved by the step motor to perform the focusing operation according to the movement steps b1. Whereas, in case that the acquired largest peak signal-to-noise ratio of the computing unit 14 is a2, the driving signal D containing the movement steps b2 of the step motor is outputted from the computing unit 14 to the step motor. Consequently, the lens module 11 is moved by the step motor to perform the focusing operation according to the movement steps b2. The relational line L as shown in FIG. 6 can be obtained according to experiments or numerical stimulations. Since the sensing units 12 and the step motors of different image pickup devices 1 have process tolerance, the relational lines L for different image pickup devices 1 are not always identical.

The relational line L of FIG. 6 can be applied to linear regression analysis. Consequently, a linear regression equation corresponding to the relational line L is obtained. The linear regression analysis is one of the statistics analysis technologies. In particular, the linear regression analysis is an approach for modeling the relationship between one or more independent variables (i.e., the peak signal-to-noise ratios of the present invention) and a dependent variable (i.e., the motor movement steps of the present invention) by using the least squares function. The principles of the linear regression analysis are well known to those skilled in the art, and are not redundantly described herein. The linear regression equation corresponding to the relational line L is stored in the computing unit 14. After the peak signal-to-noise ratio corresponding to the lowest phase difference is obtained by the computing unit 14, the peak signal-to-noise ratio corresponding to the lowest phase difference is inputted to the linear regression equation. Consequently, the required movement steps of the step motor can be obtained. In case that the relational lines L for different image pickup devices 1 are different, the linear regression equations corresponding to the relational lines L of different image pickup devices 1 are different. Preferably but not exclusively, each image pickup device 1 has to undergo the linear regression analysis before the image pickup device 1 leaves the factory, and the linear regression equation obtained from the linear regression analysis is stored in the computing unit 14. Consequently, after the image pickup device 1 leaves the factory, the image pickup device 1 can precisely perform the focusing operation.

For reducing the computation loadings of the computing unit 14, a lookup table 4 as shown in FIG. 7 is produced according to the relational line L of FIG. 6. The lookup table 4 is stored in the computing unit 14. Consequently, after the peak signal-to-noise ratio corresponding to the lowest phase difference is obtained, the required movement steps of the step motor can be inquired according to the lookup table. For example, since the peak signal-to-noise ratio corresponding to the lowest phase difference is a2, the computing unit can acquire the movement steps b2 of the step motor by using the lookup table. The use of the lookup table can reduce the computing time of the computing unit 14 in order to increase the focusing speed. In case that the relational lines L for different image pickup devices 1 are different, the lookup tables 4 of different image pickup devices 1 are different. Preferably but not exclusively, a lookup table 4 for each image pickup device 1 is produced before the image pickup device 1 leaves the factory, and the lookup table 4 is stored in the computing unit 14. Consequently, after the image pickup device 1 leaves the factory, the image pickup device 1 can precisely perform the focusing operation.

The ways of moving the lens module 11 are not restricted to the above two embodiments. That is, the mechanism of driving the lens module 11 is not restricted to the step motor. Regardless of the ways of moving the lens module 11, numerous modifications and alterations may be made while retaining the teachings of the invention.

From the above descriptions, the present invention provides an image pickup device and an image focusing method. During the image focusing process, only one image is acquired and the distance of moving the lens module to complete the focusing operation is realized according to the phase differences. In comparison with the hill-climbing method or the regression method of the conventional automatic focusing technology, the image focusing method of the present invention has to push the lens module once without the need of spending much time in searching the largest focusing value. Consequently, the image focusing speed is largely reduced, and the stability of the image focusing process is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. An image focusing method, comprising steps of:
(a) capturing an image, wherein the image contains plural phase detection pixel groups, wherein the plural phase detection pixel groups comprise plural first incident light pixels and plural second incident light pixels, respectively;
(b) collecting the plural first incident light pixels as a first pattern, and collecting the plural second incident light pixels as a second pattern, wherein the first pattern has a first block corresponding to a focusing area of the image, and the second pattern has a second block corresponding to the focusing area of the image;

(c) acquiring a phase difference between the first block and the second block and acquiring phase differences between the first block and plural test blocks, wherein the plural test blocks are partially overlapped with the second block or located near the second block; and (d) moving a lens module to perform a focusing operation according to the lowest phase difference among the plural phase differences.

2. The image focusing method according to claim 1, wherein the plural phase differences are obtained by calculating peak signal-to-noise ratios.

3. The image focusing method according to claim 1, wherein in the step (d), the lens module is moved by a step motor.

4. The image focusing method according to claim 3, wherein in the step (d), a lookup table is inquired according to the lowest phase difference, and a movement step value of the step motor corresponding to the lowest phase difference is acquired.

5. The image focusing method according to claim 3, wherein in the step (d), the lowest phase difference is inputted into a linear regression equation so as to obtain a movement step value of the step motor.

6. The image focusing method according to claim 1, wherein the plural test blocks are partially overlapped with the second block or located near the second block along a horizontal direction.

7. The image focusing method according to claim 1, wherein the plural test blocks and the second block have the same size.

8. The image focusing method according to claim 1, wherein the first incident light pixel and the second incident light pixel are respectively a left incident light pixel and a right incident light pixel, or the first incident light pixel and the second incident light pixel are respectively a right incident light pixel and a left incident light pixel.

* * * * *